United States Patent
Burger et al.

(10) Patent No.: US 7,220,968 B2
(45) Date of Patent: May 22, 2007

(54) RADIATION DETECTOR HAVING ALL-METAL CIRCUITRY OPERATION OF WHICH IS BASED ON ELECTRON SPIN

(75) Inventors: Robert Burger, Berkeley, CA (US);
Stephen Nuspl, Fridley, MN (US);
Richard Spitzer, Berkeley, CA (US);
Edward Wuori, Saint Paul, MN (US);
Frederick Zieber, Cupertino, CA (US)

(73) Assignee: Integrated Magnetoelectronics Corporation, Berkeley, CA (US)

( * ) Notice: Subject to any disclaimer, the term of this patent is extended or adjusted under 35 U.S.C. 154(b) by 0 days.

(21) Appl. No.: 11/335,859

(22) Filed: Jan. 18, 2006

(65) Prior Publication Data

US 2006/0186342 A1    Aug. 24, 2006

Related U.S. Application Data

(60) Provisional application No. 60/645,350, filed on Jan. 19, 2005.

(51) Int. Cl.
*H01L 37/00* (2006.01)
(52) U.S. Cl. .................. 250/370.01; 250/370.14; 250/370.02; 250/338.2
(58) Field of Classification Search ........... 250/370.01, 250/370.02, 338.2
See application file for complete search history.

(56) References Cited

U.S. PATENT DOCUMENTS 3,681,602 A * 8/1972 Teale ........................ 250/353
3,767,915 A * 10/1973 Battist ...................... 250/366
4,250,384 A * 2/1981 Pulvari ..................... 250/330
5,587,943 A    12/1996 Spitzer et al.
5,929,636 A    7/1999 Spitzer et al.
6,031,273 A    2/2000 Torok et al.
6,469,927 B2   10/2002 Spitzer et al.
6,483,740 B1   11/2002 Spitzer et al.
6,594,174 B2   7/2003 Choi et al.
6,828,561 B2 * 12/2004 Layman et al. ......... 250/370.02
7,057,180 B2 * 6/2006 Fifield et al. ........... 250/370.02
2004/0075152 A1  4/2004 Barna et al.
2005/0269612 A1  12/2005 Torok et al.

OTHER PUBLICATIONS

Philip's Encyclopedia, 2003, s.v. "bit," http://www.xreferplus.com/entry/4207487 (accessed Dec. 15, 2006).*

* cited by examiner

*Primary Examiner*—N. Drew Richards
*Assistant Examiner*—Jessica Eley
(74) *Attorney, Agent, or Firm*—Beyer Weaver LLP

(57) ABSTRACT

A radiation detector is described which includes first circuitry having at least one operational parameter associated therewith which is operable to change in response to radiation exposure. Second circuitry is operable to detect a change in the at least one operational parameter based on a predetermined relation between the at least one operational parameter and at least one type of radiation. The second circuitry is also operable to encode detection information representative of the radiation exposure in response thereto.

38 Claims, 5 Drawing Sheets

RADIATION DETECTOR HAVING ALL-METAL CIRCUITRY OPERATION OF WHICH IS BASED ON ELECTRON SPIN

RELATED APPLICATION DATA

The present application claims priority under 35 U.S.C. 119(e) to U.S. Provisional Patent Application No. 60/645, 350 filed Jan. 19, 2005, the entire disclosure of which is incorporated herein by reference for all purposes.

BACKGROUND OF THE INVENTION

The present invention relates to radiation detection and, more specifically, to radiation detection solutions which rely on indirect effects of radiation exposure to detect radiation events rather than the counting of electric charge produced by such events.

Conventional radiation detectors are characterized by several problems, some of which are related to the fact that the operation of such devices is typically based on counting the electric charges produced by incident radiation, either directly (by sensing the resulting currents), or indirectly (by converting the resulting electric energy into photons that are sensed separately). The need for counting efficiency typically translates into bulky detectors and/or long counting times. These issues conflict with the goals of miniaturization and high throughput. The need for cryogenic environments for some detectors further exacerbates the size and portability issue.

Conventional radiation detectors are also generally ineffective with the short range and/or low penetrating power of radiation emitted by some isotopes. Moreover, they have difficulty in discriminating between photons and neutrons, and distinguishing legitimate radioactive sources from illicit ones.

In view of these shortcomings and the increasing demand for more portable and effective radiation detectors, new radiation detection solutions are needed.

SUMMARY OF THE INVENTION

According to the invention, methods and apparatus are provided by which physical phenomena may be measured which decouple the measurement from the physical phenomena themselves. According to a specific embodiment, a radiation detector is provided which includes first circuitry having at least one operational parameter associated therewith which is operable to change in response to radiation exposure. Second circuitry is operable to detect a change in the at least one operational parameter based on a predetermined relation between the at least one operational parameter and at least one type of radiation. The second circuitry is also operable to encode detection information representative of the radiation exposure in response thereto.

According to another specific embodiment, a radiation detector is provided which includes semiconductor circuitry having at least one operational parameter associated therewith which is operable to change in response to radiation exposure. All-metal circuitry operation of which is based on electronic spin is operable to detect the changes in the at least one operational parameter based on a predetermined relation between the at least one operational parameter and at least one type of radiation, and encode detection information representative of the radiation exposure in response thereto. Interface circuitry is operable to convert signal levels between the semiconductor circuitry and the all-metal circuitry. Communication circuitry is operable to generate a detection signal representative of the detection information.

According to some embodiments, the radiation detector includes at least one semiconductor memory having a bit pattern which changes in response to radiation exposure. According to another set of embodiments, the radiation detector includes at least one tank circuit having a resonant frequency which changes in response to radiation exposure. According to various embodiments, radiation detectors designed according to the present invention may be configured as both single-event and total-dose detectors.

According to a specific embodiment, a method for calibrating a radiation detector is provided. Sensor circuitry is exposed to a known measure of radiation. The sensor circuitry has at least one operational parameter associated therewith which is operable to change in response to radiation exposure. A change is measured in the at least one operational parameter in response to the known measure of radiation. The change in the at least one operational parameter is related to the known measure of radiation. According to various embodiments, the known measure may correspond to different types and/or doses of radiation.

Radiation detection systems including multiple instances of radiation detectors designed according to the present invention are also contemplated.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Radiation detectors designed in accordance with specific embodiments of the present invention are based on a counterintuitive notion. That is, the direct effects of radiation are employed to calibrate the detector, while the detector's operation relies primarily on secondary effects that are independent of the efficiencies inherent in the counting of the electric charges produced by the radiation. According to the invention, detector operation is based on the vulnerability to radiation of semiconductor circuits, and the radiation immunity of associated circuitry. According to some embodiments, this associated circuitry is implemented as "all-metal" circuitry which is inherently immune to radiation. According to more specific embodiments, this all-metal circuitry is implemented as metal "spintronics." Metal spintronics, specific implementations of which are described below, are inherently immune to radiation as they are based on magnetic thin films rather than semiconductors.

It should be noted that the term "all-metal" as used herein refers to systems, circuits, and circuit components which do not employ semiconductor materials, but which may employ non-metallic insulating materials.

Semiconductor memories, e.g., SRAM, DRAM, flash, are subject to radiation upsets. If the memory cell size is sufficiently small, a radiation event will discharge the cell and therefore modify its contents. This vulnerability is exploited by embodiments of the present invention to develop a detector subsystem that can be configured to reliably detect various levels and types of radiation. As will be discussed, other types of semiconductor circuits may also be employed as a radiation sensing subsystem.

Figure 1:
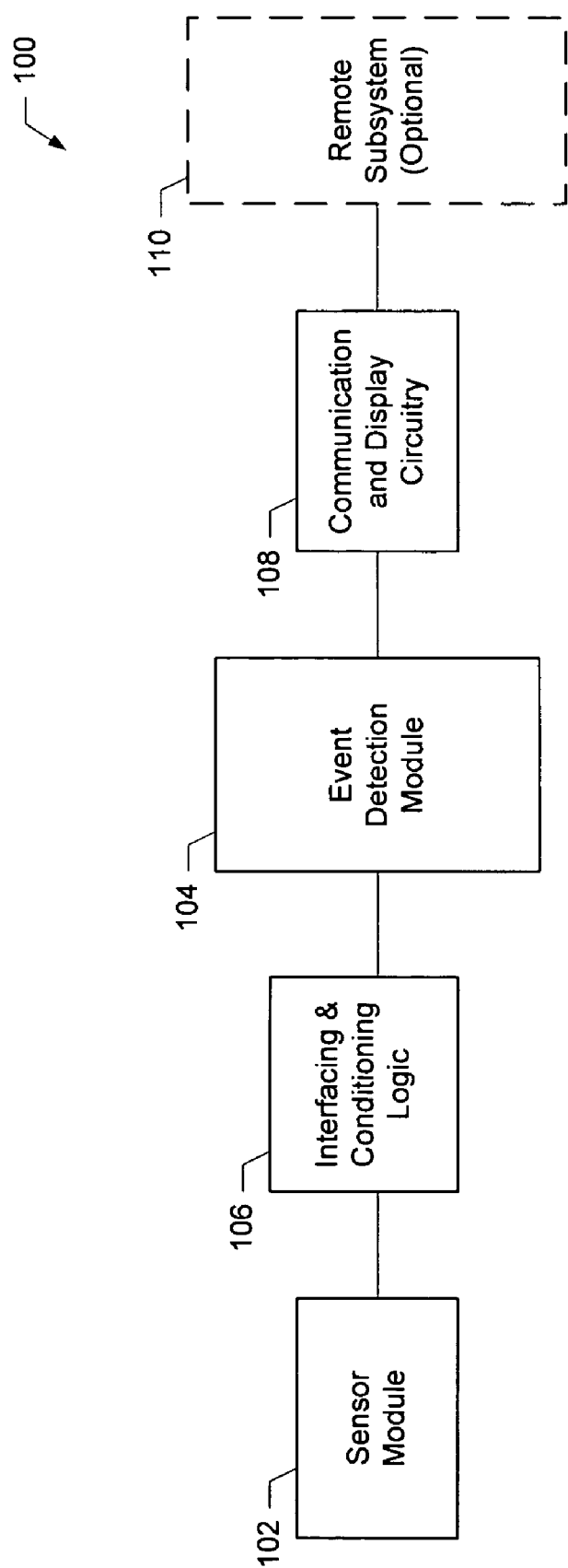
FIG. 1 is a simplified block diagram of a radiation detector designed according to a specific embodiment of the invention.

A specific embodiment of a radiation detector 100 designed in accordance with the principles of the invention is illustrated in FIG. 1. A semiconductor-based sensor module 102 (preferably unshielded) which responds predictably when subjected to a specific radiation source is employed as the sensor. An event detection module 104 detects the effects of radiation in the semiconductor sensor, encodes the information, and stores it in a digital format for eventual transmission. According to some embodiments, event detection module 104 comprises inherently radiation-hard metal-spintronic circuitry. Specific implementations of suitable metal spintronic circuitry are described below in further detail. Alternatively, module 104 may comprise other types of circuitry (e.g., semiconductor circuitry) which are shielded to mitigate radiation sensitivity.

As discussed below, the response of the circuitry in sensor module 102 to specific types and/or doses of radiation is determined during calibration of the detector so that the circuitry in module 104 may be configured to detect specific radiation exposures based on the predetermined relationship between one or more operational parameters of the sensor circuitry and the radiation to which it is exposed.

Interface module 106 provides interface circuitry between the semiconductor circuitry of sensor module 102 and the all-metal circuitry of event detection module 104; converting between the current-based logic levels of the latter and the voltage-based logic levels of the former. Exemplary implementations of interface circuitry suitable for use with various embodiments of the invention are described in U.S. Patent Publication No. US-2004-0075152-A1, the entire disclosure of which is incorporated herein by reference for all purposes.

According to a specific embodiment of the invention, radiation detector 100 comprises a radiation detector based on the degradation of a specifically designed semiconductor memory. As the physics of the effects of radiation on semiconductors is well understood, implementation of module 102 is relatively straightforward, with the selection of memory technology and type depending upon a given application.

That is, the effects of radiation on semiconductor electronics have been extensively studied for applications involving high radiation environments such as space and nuclear reactors. The effects are generally of two types. In Total Ionizing Dose (TID) effects, the operating parameters of a device are modified by the accumulation of trapped charges in insulating layers and interfaces at insulator/semiconductor boundaries. These effects are dose sensitive, though they may also have rate dependencies. In single-event upsets (SEU), device operation is modified in response to a single radiation event inducing a charge pulse in the device. These effects, together with a choice of semiconductor technologies, e.g., bipolar, jfet, mos, and choices of particular circuits, allow for a great variety of architectures for detectors designed according to the invention. As mentioned above, both single-event and total-dose implementations of radiation detectors are contemplated.

Figure 3:
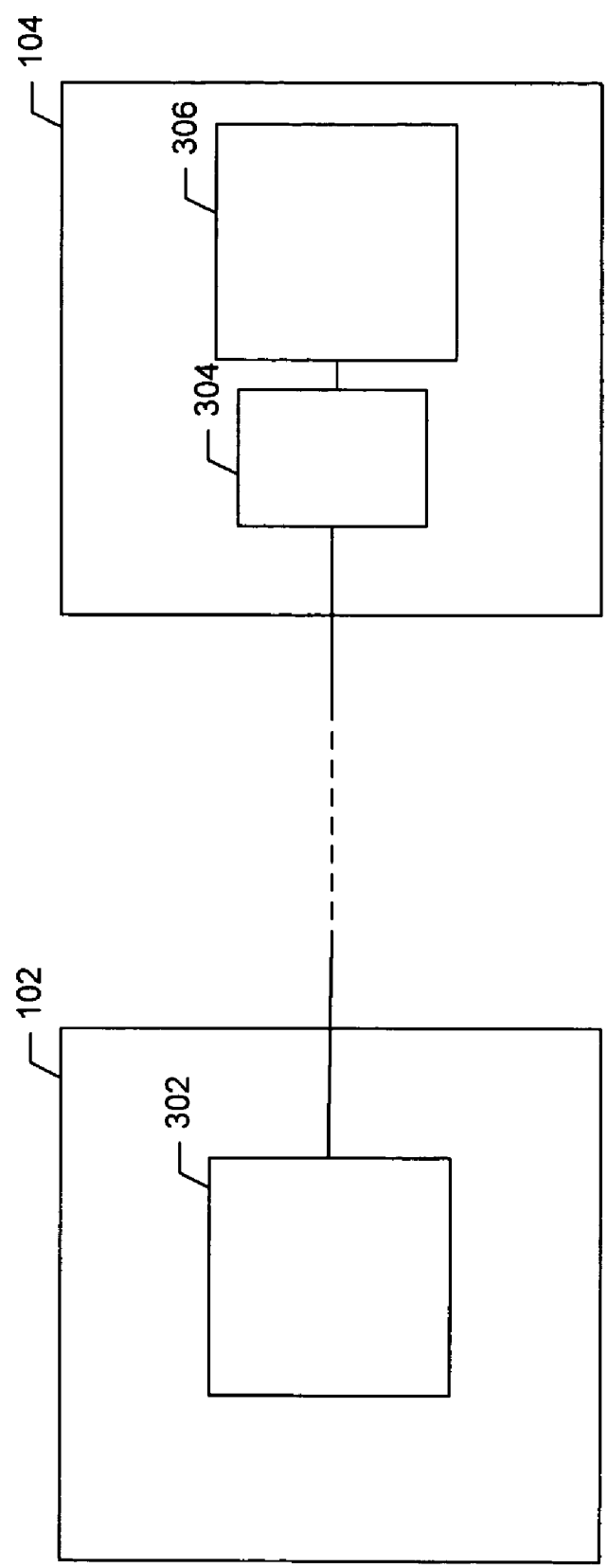
FIG. 3 is a block diagram of a portion of a specific embodiment of the radiation detector of FIG. 1 which employs a semiconductor memory circuit in the sensor module.

According to a specific embodiment which may be configured to operate as either or both a single-event or total-dose detector, sensor module 102 senses various types of radiation as changes in the contents of its memory array. That is, for example, a single bit change may indicate a single-event upset, while multiple bit changes may indicate either higher radiation levels or integration of events over a time period. A block diagram of a specific embodiment is shown in FIG. 3. For the purpose of simplicity, any interfacing circuitry which may be required for some embodiments (e.g., interface module 106 of FIG. 1) has been omitted.

Memory array 302 in sensor module 102 is read periodically by control circuitry 304 in event detection module 104 to monitor changes in bit values. According to a specific embodiment memory array 302 is implemented using flash memory because of its nonvolatility which allows the module to be unpowered between sampling periods. Use of memory cores with small feature sizes is desirable in some applications because radiation vulnerability increases with decreases in feature size. As alluded to above, little or no shielding protection of the memory core 302 is provided to achieve optimal exposure to external radiation.

Semiconductor memory array 302 and a nonvolatile memory array 306 in event detection module 104 are initially loaded with a pattern of bit values that optimizes vulnerability to radiation events. This bit pattern is established as part of the design and/or calibration of the detector. According to a specific embodiment, the storage mechanism for each bit in sensor module 102 is a charge on an isolated capacitor in a memory cell. A radiation event can leave an ionization trail through the insulator that isolates the capacitor from the cell's read-and-write circuitry. The charge in the cell can then partially discharge through this trail, changing the charge enough to exceed the read threshold to the point where the bit value has changed.

Several options may be used with various embodiments to expand the flexibility of the detector. For example, when unpowered, flash memory acts as an integrator for radiation events. Higher radiation dosages may be isolated by decreasing the sampling period over which the results are read and the memory reset. On the other hand, detector sensitivity can be improved by increasing this period.

Sensitivity also improves with decreasing feature size, but this must be balanced with the increase in potential for damage to the memory module which may make it impossible to reset it with the initial values. This destructive mode may not be a concern in embodiments in which the detector is intentionally used in such a destructive mode to detect high radiation levels. But if the detector is intended to function as a re-usable device, it should be designed so as to reduce the risk of such damage to an acceptable level. Such damage may be avoided, for example, by using a memory with sufficiently large feature size. According to some embodiments, where the magnitude of the radiation level to be detected is unknown, the detector may include multiple memories having different feature sizes (i.e., to detect different types and/or doses of radiation).

For embodiments employing a semiconductor memory, control circuitry 304 includes logic which is operable to evaluate the sensor module output with reference to the bit pattern stored in its associated nonvolatile spintronic memory 306. As discussed above, control circuitry 304 and memory 306 are preferably radiation hard to avoid the introduction of errors. The logic in control circuitry 304 compares the contents of semiconductor memory 302 with those stored in the associated nonvolatile memory 306. A wide variety of nonvolatile memory types may be employed for this memory. According to a specific embodiment, this nonvolatile memory is implemented using SpinRAM, a magnetic RAM with both memory array and support electronics implemented with metal-spintronic elements.

Examples of storage cells which may be used to implement this nonvolatile memory are described in U.S. Pat. No. 5,587,943 and No. 6,594,174, the entire disclosures of both of which are incorporated herein by reference for all purposes. Details regarding the implementation of a suitable SpinRAM array are provided in U.S. Pat. No. 6,483,740, the entire disclosure of which is incorporated herein by reference for all purposes.

According to a specific embodiment, changes in bit values detected by the logic in control circuitry 304 are logged as radiation events, with the number of changes being proportional to the intensity. The proportionality constant may be determined as part of the calibration of the detector. Control circuitry 304 also provides status information to communication and display circuitry (e.g., block 108 of FIG. 1) to make the results available externally, e.g., to an optional remote subsystem 110.

According to various implementations, a wide variety of mechanisms may be employed to communicate the output of the detector. Examples include integrated solutions as simple as a blinking LED, to more sophisticated approaches such as wireless transmission of detection information to a remote device, e.g., a central server. In any case, it will be understood that it is desirable that the components close to the radiation detector be radiation tolerant so that information transmission or display is not corrupted during a radiation event. It should also be noted that communication and display circuitry 108 and even remote subsystem 110 may be implemented using spintronic technology, but may also be implemented using conventional shielded circuitry.

In addition, the manner in which the detector output is communicated and used may vary considerably depending on the context in which the detector is deployed. For example, a detector system may contain multiple detectors with different semiconductor circuits and different sensitivities to distinguish different radionuclides, different radiation levels, or radiation events at different locations. Such sensors may send their readings automatically to a central server to generate alarms, send e-mail notifications, and/or allow radiation-event monitoring and analysis.

According to specific embodiments, the circuitry in event detection module 104 is based on metal spintronics technology which enables a wide variety of electronic systems to be fabricated from quantum magnetoresistance (QMR) films as monolithic integrated circuits made of metal and insulation layers but no semiconductors. Such devices are inherently low-noise and immune to radiation.

The multilayer magnetic thin films on which metal spintronics are based include at least two magnetic layers separated by an intervening nonmagnetic layer. These structures are of at least two types; e.g., those based on the phenomenon known as giant magnetoresistance (GMR) in which the nonmagnetic layer is a metal; and those based on the phenomenon known as tunneling magnetoresistance (TMR) in which the nonmagnetic layer is an insulator. The term QMR is used herein to refer to both of these types of structures.

The resistance of QMR structures depends on the relative orientation of the magnetizations in neighboring layers. The resistance is minimum when the magnetizations are parallel, and maximum when antiparallel. The decimal value of QMR is given by $$qmr = (R_{\uparrow\downarrow} - R_{\uparrow\uparrow})/(R_0 + R_{\uparrow\uparrow}) \quad (1)$$

where $R_0$ is the spin-independent resistance component due to scattering of charge carriers, and $R_{\uparrow\uparrow}$ ($R_{\uparrow\downarrow}$) is the spin-dependent resistance component for parallel (antiparallel) relative orientation of the magnetizations in the two layers, with $R_{\uparrow\downarrow} > R_{\uparrow\uparrow}$. The magnetic layers have well separated switching characteristics, so that the layer switching at a relatively lower field (i.e., the soft layer) can be operated without disturbing the layer that switches at a relatively higher field (i.e., the hard layer). Significant changes in resistance can be produced by applying external currents to selected magnetic layers.

As the name implies, the central role in spin-based electronics, i.e., spintronics, is not the electric charge of the electron, as in semiconductor technology, but its spin. The metal spintronics circuitry employed by some embodiments of the invention is based on magnetic thin films which are based, in turn, on either GMR or TMR, collectively QMR. This property of metal spintronics, i.e., its use of only metals and insulators, makes it inherently radiation immune and is therefore well suited for the radiation detector of the present invention. The foundation for metal spintronics is an active solid-state component, referred to herein as a transpinnor, the operation of which is controlled by electron spin rather than by the storage or motion of electric charge. A brief discussion of the transpinnor is provided below. A more detailed description of various transpinnor implementations suitable for use with embodiments of the present invention is provided in U.S. Pat. Nos. 5,929,636, 6,031,273, and U.S. Patent Publication No. US 2005/0269612 A1, the entire disclosures of each of which are incorporated herein by reference for all purposes.

Figure 2:
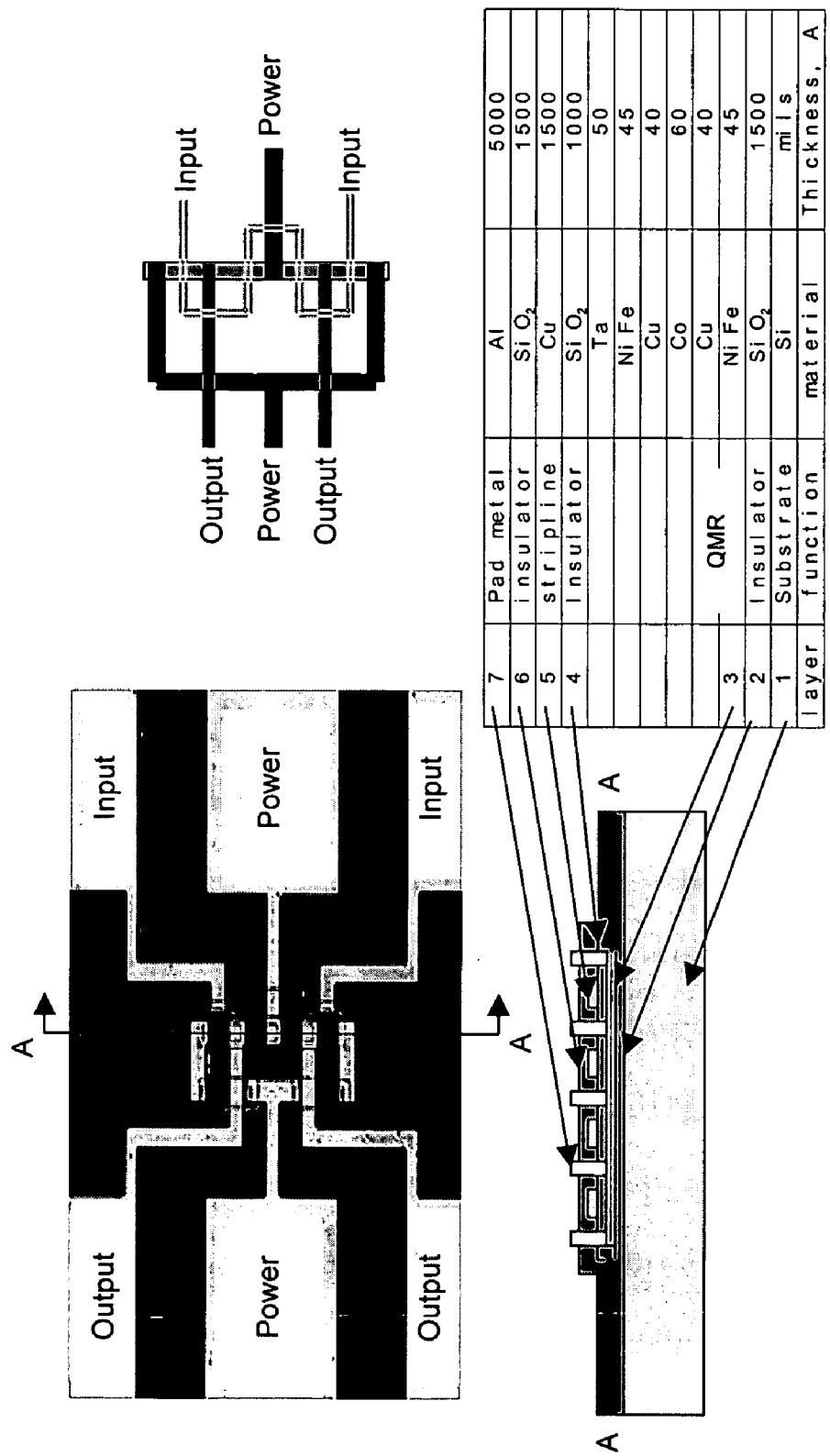
FIG. 2 shows various representations of an active, solid-state component, referred to herein as a transpinnor, which may be used with various embodiments of the invention.

The transpinnor is a multifunctional, active, solid-state device which includes a bridge network of QMR elements connected electrically to one another and to power terminals, and one or more current-carrying input lines (e.g., striplines) used to control transpinnor operation. Transpinnors are capable of gain and can be operated in analog or digital mode, both combinational and sequential. Various representations of the structure of an exemplary transpinnor are shown in FIG. 2.

As used herein, the term "transpinnor" is generic for a variety of different devices having various structural and design parameters. These include, for example, the number of inputs, the configuration of striplines with respect to the QMR elements, the current polarities in selected resistors, the direction of the switching magnetic field relative to the magnetization of the soft layers in the transpinnor, and the initial transpinnor state. For example, a transpinnor with two inputs can be configured as a differential amplifier or as any dual-input logic gate. More generally and as mentioned above, the transpinnor forms the basis for combinational and sequential logic elements and general-purpose electronics. Transpinnors are capable of gain and can be operated in analog or digital mode. Transpinnor circuits can be used for sensing, signal conditioning and amplification, digital processing, control, memory, information transmission, and actuator interfacing.

When the transpinnor is balanced its output will remain zero even with power applied to it. When unbalanced it will produce a signal. Typical transpinnor operation involves an input current that produces a magnetic field above the threshold for reversing one or more soft-layer magnetizations. This changes the film resistance(s), unbalances the transpinnor, and creates an output signal.

Transpinnors share some operational characteristics with both transistors and transformers. Like a transistor, they can be used for amplification or logic. Unlike semiconductor transistors and like a transformer, the transpinnor input is DC isolated from the output. Like a transformer, the transpinnor can be used to step voltages and currents up or down, with the input resistively isolated from the output. Unlike conventional transformers, a transpinnor has no low-frequency cutoff, i.e., the coupling is flat down to and including DC. Transpinnor operational characteristics (including amplification, current requirements, and speed) tend to improve with increasing QMR and as its dimensions shrink.

In general, transpinnor output is proportional to qmr. The surface area of transpinnors that must deliver a certain current $i_w$ into a load decreases approximately as $(qmr)^{-2}$ for fixed $i_w$ and load resistance. The power dissipated in the transpinnor while keeping the output constant decreases approximately as $(qmr)^{-2}$. Recent improvements in qmr values (some more than an order of magnitude larger than previous results) can thus be expected to lead to greatly reduced power requirements and chip area, as well as larger output.

The hysteretic portion of the GMR response curve can be used to store the transpinnor's last output state, even after power is removed. When transpinnor power is re-applied, its output becomes a function of its last state rather than of its input. This inherent transpinnor nonvolatility allows for storing intermediate results such as, for example, the detected change in the resonant frequency of a radiation sensor based on a semiconductor tank circuit (see below). Thus, in some embodiments, transpinnors without autolatch capability may be used to compute logic values, and transpinnors with autolatch capability to store the sensor results.

The processing of metal spintronics is based on a mature technology making such all-metal circuits simple and inexpensive to manufacture. This technology involves about one-third the number of masking steps as semiconductor circuits, eliminating some of the most expensive ones (e.g., ion implantation) altogether.

For completeness we note that the current output of a transpinnor is proportional to its resistive imbalance. Thus, discrimination between logic levels is given by the ratio [qmr/(dR/R)] of magnetic imbalance produced by the QMR effect to that when the transpinnor is magnetically balanced but residually unbalanced due to fabrication imperfections; here qmr is the fractional value of the QMR effect and dR is the difference in QMR-element resistances, of average value R, due to lack of fabrication precision. Therefore, according to some embodiments, a technique referred to herein as magnetoresistive trimming is employed to balance QMR circuits resistively to specified accuracy. The technique involves partial switching of magnetization of selected layers of QMR films. Additional detail about magnetoresistive trimming techniques suitable for use with the embodiments of the present invention are provided in U.S. Pat. No. 6,469,927, the entire disclosure of which is incorporated herein by reference for all purposes.

As mentioned above, semiconductor memories, like transistors, are affected by radiation of all types (e.g., nucleon, alpha, electron, X-ray, gamma ray), and the effects are largely known and can readily be quantified. Suitable memory cores for particular applications may thus be readily identified by analyzing radiation effects in semiconductor memories. Cell feature size and the ability to obtain chips without radiation protective coatings are factors in identifying eligible cores. And although many different types of memory may be used, specific embodiments of the invention employ flash memory (e.g., rather than SRAM or DRAM) because of its nonvolatility. As mentioned above, embodiments are contemplated which employ multiple memory arrays with different feature sizes, thereby providing sensing capability for different levels and/or types of radiation.

As mentioned above, the indicator of radiation events are the bit changes in the detector's semiconductor memory array. According to specific embodiments, radiation events are treated as failure events in failure analysis, i.e., the methodology for converting the radiation events into a statistically predictable detector are quite similar to failure-rate analysis. According to one such embodiment, the Weiball plot, is used in the analysis. The Weiball plot is a graphical technique for determining if a data set comes from a population that would logically be fit by a 2-parameter Weiball distribution.

This approach assumes a population of devices run to failure. The horizontal axis is time to failure (on a log scale). The vertical axis is the cumulative number of failures (on a log(log) scale). The number of bit changes in a memory array is incorporated into a Weiball plot. If the line through the experimental points is straight (typically at about 45°), the Weiball distribution applies and certain constants for the distribution can be estimated from the plot. This technique is used to establish statistically significant models for degradation of these devices: determine hit frequency, photon or particle conversion efficiencies, and design parameters. Once these parameters are known, sensor sensitivity can be designed straightforwardly. It should be noted that, while the Weiball plot may be particularly well suited for some applications, other statistical methods may be employed with various embodiments of the invention.

Figure 4:
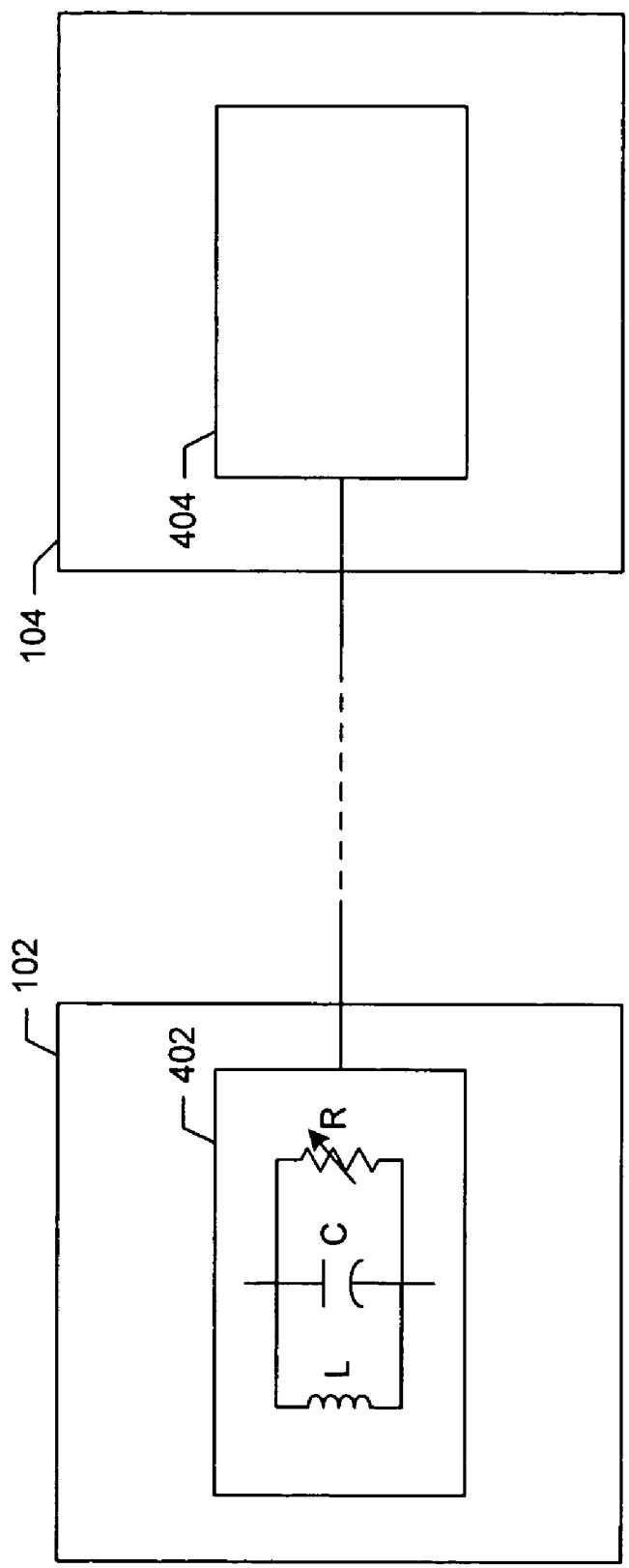
FIG. 4 is a block diagram of a portion of a specific embodiment of the radiation detector of FIG. 1 which employs a semiconductor tank circuit in the sensor module.

According to another set of embodiments which can function as either single-event or total-dose detectors, a tank-oscillator circuit with radiation-sensitive semiconductor resistors (e.g., in sensor module 102) is employed with a radiation-tolerant QMR control circuitry (e.g., in event detection module 104). A block diagram representation of such an implementation is shown in FIG. 4. Again, for the sake of simplicity, any necessary interface circuitry (which may be required for some embodiments) between modules 102 and 104 has been omitted.

Tank circuit 402 has resonant frequency $$\omega_n = (LC)^{-1/2} \quad (2)$$

and damped frequency $$\omega_d^2 = (1-\xi^2)\omega_n^2 \quad (3a)$$

$$\xi = (L/C)^{1/2}/(2R) \quad (3b)$$

where L is the circuit inductance, C is the circuit capacitance, and R is the circuit resistance.

Tank circuit 402 in sensor module 102 is loaded by a semiconductor resistor R whose degradation under radiation causes the frequency of the circuit to shift. The shift in $\omega_d$ is detected by logic in the all-metal control circuitry 404 of event detection module 104. As will be discussed with reference to FIGS. 5A and 5B, control circuitry 404 may be implemented in a variety of ways. According to Eq. 3, as the resistance of the semiconductor element changes, the damped resonant frequency $\omega_d$ of its tank decreases with decreasing resistance and increases with increasing resistance.

The semiconductor resistor changes in two ways; a first due to temporary charge-carrier generation, and a second due to atomic movement caused by the incident particles and resulting in permanent defects. The two effects cause opposite changes in the resonant-circuit resistance and in the damped frequency. Thus, such a detector can be used as either a single-event (i.e., real-time) detector or as a total-dose detector.

In an implementation configured as a real-time detector, charge carriers created by the radiation-induced particle events result in a decrease in semiconductor resistance (i.e., a temporary increase in conductivity due to the shower of hole-electron pairs) which is measured during the events as a decrease in damped resonant frequency. On the other hand, in an implementation configured as a total-dose detector, the semiconductor resistance increases with dose and results in an increase in the damped resonant frequency over time. Such a detector is of use, for example, in applications in which the detector rides along with an object being monitored.

According to some embodiments, such frequency shifts are measured by control circuitry 404 with reference to a stable frequency reference of sufficient accuracy to enable detection of changes in the period of the resonant circuit. This may be implemented, for example, using a crystal. However, because a crystal may itself be vulnerable to radiation, specific embodiments employ QMR circuitry to provide a radiation-immune reference to measure the oscillator period. According to such embodiments, semiconductor tank circuit 402 produces an oscillating current whose sign is reversed twice during each cycle. According to a specific embodiment represented by FIG. 5A, the tank frequency is determined by control circuitry 404 using current sensing circuitry 502 to sense the current produced by tank circuit 402 and a counter 504 to count the number of cycles of a clock between zero crossings of the tank-circuit current. The count value between zero crossings is proportional to the period of tank circuit 402. The proportionality constant is initially calibrated relative to a known frequency, $f_{REF}$. In a specific embodiment, a QMR counter in control circuitry 404 is driven by a clock of known frequency generated by a transpinnor-based ring oscillator. The count is read and reset to zero at each zero crossing of tank circuit 402. Sufficient deviations from a calibration count derived from the initial tank oscillation frequency are detected as radiation events. As will be understood, the oscillator associated with the QMR counter may be designed to balance out any associated temperature variation against temperature variations in the semiconductor resonant circuit.

Figure 5B:
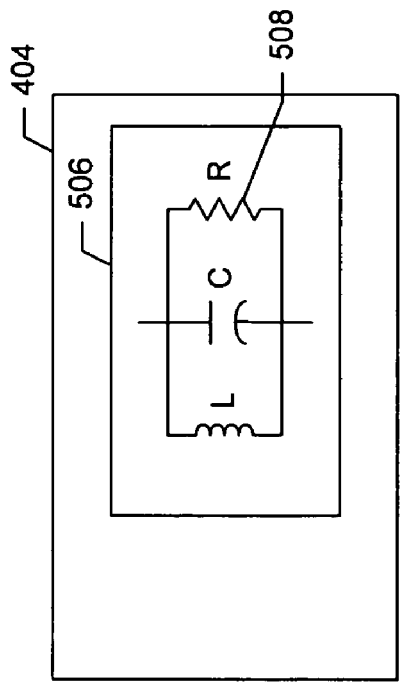
FIGS. 5A and 5B represent alternative implementations of a portion of control circuitry 404 of FIG. 4.
Figure 5A:
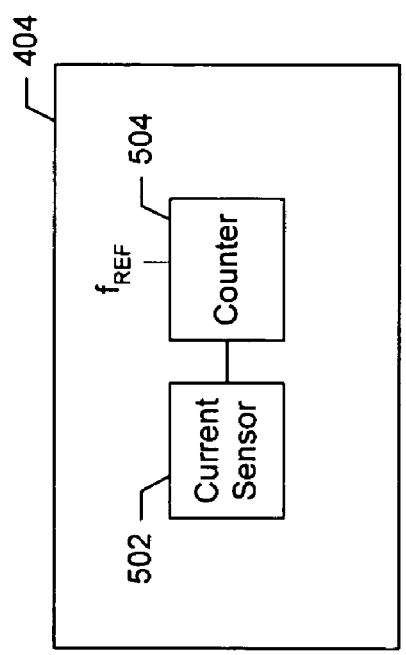

According to yet another specific embodiment of the invention represented in FIG. 5B, two tank oscillator circuits are employed, one with radiation-sensitive semiconductor resistors (i.e., tank circuit 402), and one with radiation-tolerant QMR resistors (i.e., tank circuit 506 in control circuitry 404). The inductors and capacitors in the respective tank circuits are matched so that the two circuits have the same resonant frequency $\omega_n$. One circuit (i.e., tank 402) is loaded by a semiconductor resistor and the other (i.e., tank 506) by a QMR resistor 508. The resistors are the same value prior to exposure to radiation, so initially there is no difference in the two damped frequencies. As the semiconductor resistor changes value due to radiation effects, the damped resonant frequency $\omega_d$ of its tank changes. By contrast, because it is radiation tolerant, the QMR resistor will remain substantially unchanged. The difference in damped resonant frequencies is specific to the nature of the radiation effects in the semiconductor resistance. The shift in $\omega_d$ is detected by the logic in control circuitry 404 of event detection module 104.

And as with the semiconductor memory implementations described above, embodiments employing tank circuits may be configured to detect different types and/or doses of radiation. For example, the relationships between oscillator frequency and various types of radiation events may be determined during the calibration process. Multiple tank circuits may then be monitored by associated circuitry which is configured to detect based on these different predetermined relationships. According to some embodiments, multiple tank circuits may not be required in that the logic associated with the radiation insensitive circuitry may be configured to monitor and detect different types of radiation events with regard to the operational parameter(s) of single semiconductor tank circuit.

Regardless of whether a detector designed according to the invention is a single-event (i.e., real-time) or total-dose device, the results of the detection may be externally communicated using a wide variety of mechanisms. According to a specific embodiment of the invention module 108 of FIG. 1 employs RFID technology to transmit the radiation sensor output to the user or an external subsystem. According to a more specific embodiment, communication and display module 108 comprises a QMR-tuned wireless communication module which impresses the digital output of the discrimination logic of event detection module 104 onto an RF carrier for decoding by an external reader, e.g., part of subsystem 110, in a manner similar to RFID tags currently in widespread use.

According to an even more specific embodiment, The QMR-tuned wireless module includes a QMR tank circuit which operates similar to the radiation detector tank circuit described above. However, in this case, a QMR resistor or a transpinnor is used to excite and/or damp the oscillations in the tank circuit to produce RF that is modulated with the radiation measurement information and which is then detected and decoded by an external RF receiver. Use of QMR circuitry for this purpose avoids the need for radiation hardening and ultimately leads to a low-cost radiation detector.

Power may be provided to radiation detectors designed according to the invention in a wide variety of ways. For example, implementations are contemplated which are powered by onboard batteries. Alternatively, power may be provided to the detector from an external source such as, for example, focused RF power. In environments with sufficient sunlight, solar collectors may be employed. A wide variety of other options within the knowledge of those skilled in the art are also within the scope of the invention.

Radiation detectors designed according to the present invention may be deployed in a wide variety of ways to meet a wide variety of objectives. As will be understood, the nature of the particular application is factored into the design of both the sensor subsystem and the networked monitoring and alarm system that receives information from the sensors and acts on events. System parameters to consider include, for example, sensor placement, communication rates, discrimination control, data collection, and logging and alarm generation. For example, a radiation detection system may be largely automated with parameter and observation control from a central server accessible by an operator over the Internet. In such a case, the operator could select radiation-event scenarios that would be adjusted to the environment being monitored and can respond to detected events as needed.

The placement of the radiation detectors relative to the environment being monitored may also vary considerably within the scope of the invention. For example, in some implementations, the entire detection system is housed in a single portable device (e.g., the size of a credit card). In other implementations, the detector(s) and communication subsystems may be separate such as, for example, a detection system for use in container ship ports. Such a system might have detectors designed according to the invention attached to cargo and a separate interrogation/communication subsystem which is either part of a portable or stationary device.

As will be appreciated, various implementations of the radiation detector of the present invention address some or all of the shortcomings of conventional detectors. For example, the typical components needed to identify an individual radioisotope by a calibrated conventional spectroscopy detector might include a high-purity germanium detector, its associated amplifiers and pulse processor, and a computer to pull the spectrum from a lookup table and perform the identification and any related data processing. By contrast, for specific embodiments of the invention, the change in resistance of a semiconductor circuit and the consequent change in its resonant frequency will have been precalibrated to identify a specific radioisotope, and the processing to detect the changed frequency, digitize and store the result, and prepare for transmission of the signature is therefore straightforward, i.e., it will all be handled by the transpinnor control/logic part of the detector.

Similarly, the difficulty in using existing instruments to detect isotopes that emit short-range radiation is obviated in many applications because detectors designed according to the invention can be placed in close proximity to potential sources of radiation. The stored result may then be sensed at much larger distances by, for example, an RF signal at the time of detection.

Legitimate radioactive sources such as radiopharmaceuticals and a variety of commercially transported goods, can trigger false alarms from conventional radiation detectors. By contrast, some detectors designed according to the invention may rely on multiple sensors with distinctly unique signatures to distinguish legitimate from illicit radionuclides.

Embodiments of the present invention will result in an entirely new class of inexpensive devices operable to detect and monitor radiological materials and characterize the radiation environment in a wide range of applications. For example, the low cost and small size of some implementations make them well suited for applications in space. That is, scientific instruments for space missions must typically be small because of limited spacecraft accommodations. Many presently funded and future missions call for radiation detectors which are miniaturized to the extent possible. Specific applications include characterizing the radiation on planetary surfaces, in situ measurements of the radiation environment around and on the surface of asteroids, characterizing the space radiation environment for future or current human explorers using both robotic and human-occupied spacecraft, neutron detectors for tracking surface water, and the like. Miniaturized radiation detectors capable of autonomous operation on a variety of space missions are enable by the present invention and will greatly enhance the science return from the next generation of planetary exploration.

In addition to space applications, the radiation detectors designed according to the invention will find a wide variety of commercial uses such as, for example, non-intrusive monitoring of radioactive materials in hospitals, nuclear power plants, and at accelerator facilities. Beyond detection of radiation, the generic structure of some embodiments of the invention, e.g., single-chip system with a mix of sensor, memory, processing, and wireless transmission, lends itself to a multitude of other military, space, and commercial applications.

Radiation detectors designed according to the present invention also have the potential for use by the federal government in remote and perimeter monitoring, securing industrial facilities, and monitoring the stream of containers in US-bound cargo. Possible commercial applications include industrial sensing, materials analysis, radioactive-waste monitoring, environmental remediation, and medical imaging.

While the invention has been particularly shown and described with reference to specific embodiments thereof, it will be understood by those skilled in the art that changes in the form and details of the disclosed embodiments may be made without departing from the spirit or scope of the invention. For example, embodiments have been described herein in which sensor circuitry is implemented as semiconductor memory and tank circuits employing semiconductor components. However, other types of radiation sensitive circuits could be used as the basis for such sensor circuitry.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A radiation detector, comprising:
   unshielded semiconductor circuitry having at least one operational parameter associated therewith which is operable to change in response to radiation exposure;
   all-metal circuitry operation of which is based on electronic spin and which is operable to detect a change in the at least one operational parameter based on a predetermined relation between the at least one operational parameter and at least one type of radiation, and encode detection information representative of the radiation exposure in response thereto;

interface circuitry coupled to the semiconductor circuitry and the all-metal circuitry which is operable to convert signal levels therebetween; and communication circuitry operable to generate a detection signal representative of the detection information.

2. The radiation detector of claim 1 wherein the semiconductor circuitry comprises at least one semiconductor memory.

3. The radiation detector of claim 2 wherein the at least one operational parameter comprises a first bit pattern stored in the semiconductor memory, and wherein the all-metal circuitry comprises an all-metal memory having a second bit pattern stored therein, the all-metal circuitry further comprising all-metal logic operable to detect the change in the at least one operational parameter by comparing the first and second bit patterns.

4. The radiation detector of claim 3 wherein the all-metal logic is further operable to convert the detected change to the detection information based on an algorithm derived at least in part from a failure-rate analysis.

5. The radiation detector of claim 4 wherein the failure-rate analysis employs a Weiball plot.

6. The radiation detector of claim 2 wherein the semiconductor memory comprises one of flash memory, SRAM, DRAM.

7. The radiation detector of claim 2 wherein the at least one semiconductor memory comprises a plurality of semiconductor memories, each semiconductor memory being configured to sense one of a plurality of radiation types.

8. The radiation detector of claim 7 wherein the plurality of radiation types includes any of nucleon, alpha, electron, X-ray, and gamma ray.

9. The radiation detector of claim 2 wherein the at least one semiconductor memory comprises a plurality of semiconductor memories, each semiconductor memory being configured to sense one of a plurality of exposure levels of a particular radiation type.

10. The radiation detector of claim 1 wherein the semiconductor circuitry comprises at least one tank circuit, and the at least one operational parameter comprises a resonant frequency of the at least one tank circuit.

11. The radiation detector of claim 10 wherein the at least one tank circuit and the all-metal circuitry are configured to sense a plurality of radiation types.

12. The radiation detector of claim 11 wherein the plurality of radiation types includes any of nucleon, alpha, electron, X-ray, and gamma ray.

13. The radiation detector of claim 10 wherein the at least one tank circuit and the all-metal circuitry are configured to sense a plurality of exposure levels of a particular radiation type.

14. The radiation detector of claim 10 wherein each tank circuit comprises a semiconductor resistor having a resistance associated therewith which changes in response to the radiation exposure.

15. The radiation detector of claim 1 wherein the all-metal circuitry comprises an any of memory cells, each memory cell comprising a multi-layer structure exhibiting magnetoresistance, each multi-layer structure comprising a plurality of magnetic layers at least one of which is operable to magnetically store a bit of information, a plurality of access lines integrated with the plurality of magnetic layers and configured such that the bits of information may be accessed using selected ones of the plurality of access lines and a magnetoresistive effect, and at least one keeper layer, wherein the magnetic layers, the access lines, and the at least one keeper layer associated with each multi-layer structure form a substantially closed flux structure.

16. The radiation detector of claim 1 wherein the all-metal circuitry comprises a plurality of solid-state components, each solid-state component being operable to generate an output signal based on a magnetoresistive effect.

17. The radiation detector of claim 16 wherein each of selected ones of the solid-state components comprises a network of multi-layer thin-film elements, at least one thin-film element exhibiting magnetoresistance, each selected solid-state component further comprising a conductor coupled to the at least one thin-film element for controlling operation of the solid-state component, wherein the solid-state component is operable to generate the output signal as a function of a resistive imbalance among the thin-film elements, the output signal being proportional to a power current in the network of thin-film elements.

18. The radiation detector of claim 1 wherein the interface circuitry is operable to convert between voltage-based logic levels associated with the semiconductor circuitry and current-based logic levels associated with the all-metal circuitry.

19. The radiation detector of claim 1 wherein the communication circuitry comprises circuitry for presenting a visual representation of the detection signal.

20. The radiation detector of claim 1 wherein the communication circuitry comprises transmission circuitry for transmitting the detection signal to a remote device.

21. The radiation detector of claim 20 wherein the transmission circuitry comprises a wireless transmitter.

22. The radiation detector of claim 1 wherein the semiconductor circuitry and all-metal circuitry are configured to detect the radiation exposure in real time.

23. The radiation detector of claim 1 wherein the semiconductor circuitry and all-metal circuitry are configured to determine a dose of the radiation exposure over a period of time.

24. A radiation detection system comprising a plurality of the radiation detector of claim 1 for deployment in an environment.

25. The radiation detection system of claim 24 further comprising at least one detector reader device operable to receive the detection signals from the plurality of radiation detectors.

26. The radiation detection system of claim 25 further comprising a computing device associated with the detector reader device which is operable to process the received detection signals and generate a human-readable representation of the detection signals.

27. The radiation detection system of claim 26 wherein the computing device is further operable to generate a machine-readable representation of the detection signals for transmission to a secondary system operable to perform at least one of storage, processing, and distribution of the machine readable representation.

28. The radiation detection system of claim 24 wherein each radiation detector is associated with a movable item in the environment, the detection signal generated by each radiation detector representing radiation associated with the associated item.

29. The radiation detection system of claim 24 wherein each radiation detector is deployed at a fixed location relative to the environment.

30. The radiation detector of claim 1 further comprising a power source comprising any of a battery, an RF receiver operable to receive and distribute focused RF power, and a solar collector.

31. A radiation detector, comprising:

first circuitry having at least one operational parameter associated therewith which is operable to change in response to radiation exposure, wherein the first circuitry includes a semiconductor memory, and the at least one operational parameter comprises a first bit pattern stored in the semiconductor memory; and second circuitry operable to detect a change in the at least one operational parameter based on a predetermined relation between the at least one operational parameter and at least one type of radiation, and encode detection information representative of the radiation exposure in response thereto, wherein the second circuitry includes a second memory having a second bit pattern stored therein, the second circuitry further including logic operable to detect the change in the at least one operational parameter by comparing the first and second bit patterns, the logic further being operable to convert the detected change to the detection information based on an algorithm derived at least in part from a failure-rate analysis which employs a Weiball plot.

32. A radiation detector, comprising:

first circuitry having at least one operational parameter associated therewith which is operable to change in response to radiation exposure; and second circuitry operable to detect a change in the at least one operational parameter based on a predetermined relation between the at least one operational parameter and at least one type of radiation, and encode detection information representative of the radiation exposure in response thereto;

wherein the first and second circuitry are configured to detect a plurality of exposure levels of a particular radiation type.

33. A radiation detector, comprising:

first circuitry having at least one operational parameter associated therewith which is operable to change in response to radiation exposure, wherein the first circuitry comprises a semiconductor tank circuit, and the at least one operational parameter relates to a resonant frequency of the tank circuit; and second circuitry operable to detect a change in the at least one operational parameter based on a predetermined relation between the at least one operational parameter and at least one type of radiation, and encode detection information representative of the radiation exposure in response thereto.

34. The radiation detector of claim 33 wherein the second circuitry comprises a second tank circuit having a resonant frequency, the second circuitry being operable to detect the change in the at least one operational parameter by comparing the resonant frequencies of the semiconductor and second tank circuits.

35. The radiation detector of claim 33 wherein the second circuitry comprises a counter operable to generate a count characterizing the resonant frequency of the semiconductor tank circuit, the second circuitry being operable to detect the change in the at least one operational parameter with reference to the count.

36. A radiation detector, comprising:

first circuitry having at least one operational parameter associated therewith which is operable to change in response to radiation exposure; and second circuitry operable to detect a change in the at least one operational parameter based on a predetermined relation between the at least one operational parameter and at least one type of radiation, and encode detection information representative of the radiation exposure in response thereto;

wherein the first and second circuitry are configured to detect the radiation exposure in real time.

37. A radiation detector, comprising:

first circuitry having at least one operational parameter associated therewith which is operable to change in response to radiation exposure; and second circuitry operable to detect a change in the at least one operational parameter based on a predetermined relation between the at least one operational parameter and at least one type of radiation, and encode detection information representative of the radiation exposure in response thereto;

wherein the first and second circuitry are configured to determine a dose of the radiation exposure over a period of time.

38. A method for calibrating a radiation detector, comprising:

exposing sensor circuitry to a known measure of radiation, the sensor circuitry having at least one operational parameter associated therewith which is operable to change in response to radiation exposure;

measuring a change in the at least one operational parameter in response to the known measure of radiation;

relating the change in the at least one operational parameter to the known measure of radiation; and configuring the radiation detector with reference to the relation between the change in the at least one operational parameter and the known measure of radiation.

* * * * *

UNITED STATES PATENT AND TRADEMARK OFFICE
CERTIFICATE OF CORRECTION

| | |
|---|---|
| PATENT NO. | : 7,220,968 B2 |
| APPLICATION NO. | : 11/335859 |
| DATED | : May 22, 2007 |
| INVENTOR(S) | : Burger et al. |

Page 1 of 1

It is certified that error appears in the above-identified patent and that said Letters Patent is hereby corrected as shown below:

In the Cover Page:

In the section (56) References Cited, after U.S. Patent Documents, add:

--FOREIGN PATENT DOCUMENTS

JP    A-2001-228086    8/2001--.

In the Claims:

In line 2 of claim 15 [column 13, line 58] change "any" to --array--.

Signed and Sealed this

Twenty Second Day of April, 2008

JON W. DUDAS
*Director of the United States Patent and Trademark Office*